(12) United States Patent
Cocchi et al.

(10) Patent No.: US 11,185,090 B2
(45) Date of Patent: Nov. 30, 2021

(54) MACHINE AND METHOD FOR MAKING FOOD PRODUCTS

(71) Applicant: ALI GROUP S.R.L.—CARPIGIANI, Cernusco Sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco Sul Naviglio (IT)

( * ) Notice: Subject to any disclaimer, the term of this patent is extended or adjusted under 35 U.S.C. 154(b) by 124 days.

(21) Appl. No.: 16/434,883

(22) Filed: Jun. 7, 2019

(65) Prior Publication Data
US 2019/0380358 A1    Dec. 19, 2019

(30) Foreign Application Priority Data

Jun. 14, 2018   (IT) .......................... 102018000006332

(51) Int. Cl.
*A23G 9/20*    (2006.01)
*A23G 9/12*    (2006.01)
(Continued)

(52) U.S. Cl.
CPC ................ *A23G 9/20* (2013.01); *A23G 9/12* (2013.01); *A23G 9/228* (2013.01); *A23G 9/28* (2013.01)

(58) Field of Classification Search
CPC ... A23G 9/04; A23G 9/12; A23G 9/20; A23G 9/228; A23G 9/28; A23P 30/40; A23P 2030/405
See application file for complete search history.

(56) References Cited

U.S. PATENT DOCUMENTS 5,410,888 A * 5/1995 Kaiser ...................... A23G 9/20
                                                              251/30.01
5,419,150 A * 5/1995 Kaiser ...................... A23G 9/16
                                                              62/342
(Continued)

FOREIGN PATENT DOCUMENTS

| CN | 106889294 A | 6/2017 |
| EP | 1787944 A1 | 5/2007 |

(Continued)

OTHER PUBLICATIONS

Italian Search Report dated Jan. 31, 2019 from counterpart Italian App No. IT201800006332.

*Primary Examiner* — Nelson J Nieves
*Assistant Examiner* — Miguel A Diaz
(74) *Attorney, Agent, or Firm* — Shuttleworth & Ingersoll, PLC; Timothy Klima (57) ABSTRACT

A machine for making food products including: at least a first container containing a liquid or semi-liquid base product to be processed therein; a stirrer mounted inside the first container; thermal treatment means operatively associated with the first container; a dispenser connected to the first container to allow the product to be extracted from the first container; at least one device for generating gas micro bubbles or nano bubbles, operatively configured to release gas micro bubbles or nano bubbles into the mixture being processed in the machine; a control and drive unit connected to the device for generating gas micro bubbles or nano bubbles in order to control and drive it.

23 Claims, 8 Drawing Sheets

(51) Int. Cl.
*A23G 9/22* (2006.01)
*A23G 9/28* (2006.01)

(56) References Cited

U.S. PATENT DOCUMENTS

| | | | | |
|---|---|---|---|---|
| 5,758,571 | A * | 6/1998 | Kateman | A23G 9/04 |
| | | | | 99/455 |
| 10,321,700 | B2 * | 6/2019 | Cocchi | A23G 9/28 |
| 10,888,102 | B2 * | 1/2021 | Tuchrelo | F25D 23/126 |
| 2005/0064074 | A1 * | 3/2005 | Whiteside | A23G 9/22 |
| | | | | 426/101 |
| 2005/0106301 | A1 * | 5/2005 | Jones | A23G 9/12 |
| | | | | 426/524 |
| 2007/0101759 | A1 * | 5/2007 | Matsuoka | F25B 43/043 |
| | | | | 62/475 |
| 2010/0055266 | A1 * | 3/2010 | Windhab | A23P 30/40 |
| | | | | 426/317 |
| 2012/0223094 | A1 * | 9/2012 | Rickard, Jr. | A23G 9/045 |
| | | | | 222/1 |
| 2013/0174581 | A1 * | 7/2013 | Rasmussen | F25D 5/02 |
| | | | | 62/4 |
| 2013/0269540 | A1 * | 10/2013 | Lazzarini | A23C 9/1223 |
| | | | | 99/455 |
| 2015/0296859 | A1 * | 10/2015 | Israni | A23L 3/375 |
| | | | | 426/312 |
| 2016/0113305 | A1 * | 4/2016 | Cocchi | A23G 9/28 |
| | | | | 426/231 |
| 2018/0098553 | A1 * | 4/2018 | Cocchi | A23G 9/30 |
| 2018/0110238 | A1 * | 4/2018 | Mohammed | A23G 9/282 |
| 2019/0380358 | A1 * | 12/2019 | Cocchi | A23G 9/228 |
| 2020/0060317 | A1 * | 2/2020 | Zhu | C01B 13/0251 |
| 2020/0061529 | A1 * | 2/2020 | Zhu | A23L 3/3418 |

FOREIGN PATENT DOCUMENTS

| | | |
|---|---|---|
| EP | 2043769 A1 | 4/2009 |
| EP | 3045048 A1 | 7/2016 |
| JP | 2009165459 A | 7/2009 |
| WO | 9515090 A2 | 6/1995 |
| WO | 2015160594 A1 | 10/2015 |

* cited by examiner

MACHINE AND METHOD FOR MAKING FOOD PRODUCTS

This application claims priority to Italian Patent Application No. 102018000006332 filed Jun. 14, 2018, the entirety of which is incorporated by reference herein.

BACKGROUND OF THE INVENTION

This invention relates to a machine (and a method) for processing, or thermally treating, food products (specifically, liquid or semi-liquid food products), specifically, but not necessarily, machines for making ice cream or chilled patisserie products (gelato, soft serve ice cream, slush drinks, sorbet, milkshakes, yogurt, frozen desserts, dessert creams, whipped cream, etc.).

For example, in the ice cream trade in question, ice cream machines are known which comprise a batch freezing cylinder associated with a refrigeration system and equipped with a stirrer.

The batch freezing cylinder allows making the finished product (for example, ice cream) from a base mixture supplied by another container.

Also known in the trade concerned are machines, such as pasteurizers for example, used for thermally treating food products and mixtures.

These pasteurizers are equipped with a container, provided with a stirrer, in which the base product that will subsequently be processed is, generally speaking, thermally treated.

A particularly strongly felt need in the trade concerned is the need for solutions which can constitute a valid alternative to existing types of machines and which can, in particular, guarantee that the end product made is of high quality.

SUMMARY OF THE INVENTION

This invention therefore has for an aim to meet the above mentioned need, that is to say, to be able to provide a machine and a method for thermally treating (specifically for making, batch freezing and dispensing) food products, specifically ice cream type products and which can constitute an alternative to the technical solutions existing to date.

The aim of this invention is therefore to provide a machine and a method for thermally treating (specifically for making, batch freezing and dispensing) food products, specifically ice cream type products and which can make a product of particularly high quality and with good organoleptic properties. According to the invention, these aims are achieved by a machine and a method forming the objects of this invention and comprising technical features as disclosed herein.

BRIEF DESCRIPTION OF THE DRAWINGS

The technical features of the disclosure, with reference to the above aims, are clearly described in the claims below and its advantages are apparent from the detailed description which follows, with reference to the accompanying drawings which illustrate a preferred, non-limiting example embodiment, and in which:

DESCRIPTION OF THE PREFERRED EMBODIMENTS

With reference to the accompanying drawings, the numeral 1 denotes an apparatus or machine for making food products.

Preferably, the food products are ice cream and chilled patisserie products and the like (gelato soft serve ice cream, slush drinks, sorbet, milkshakes, yogurt, frozen desserts, dessert creams, etc.).

Preferably, the food products are liquid or semi-liquid food products.

It should be noted, generally speaking, that processing (that is, treatment in the machine 1) results in air being incorporated into product of this kind. The air in these food products determines their physical, quality and organoleptic properties (for example, taste and/or texture and/or appearance and/or consistency).

Figure 1:
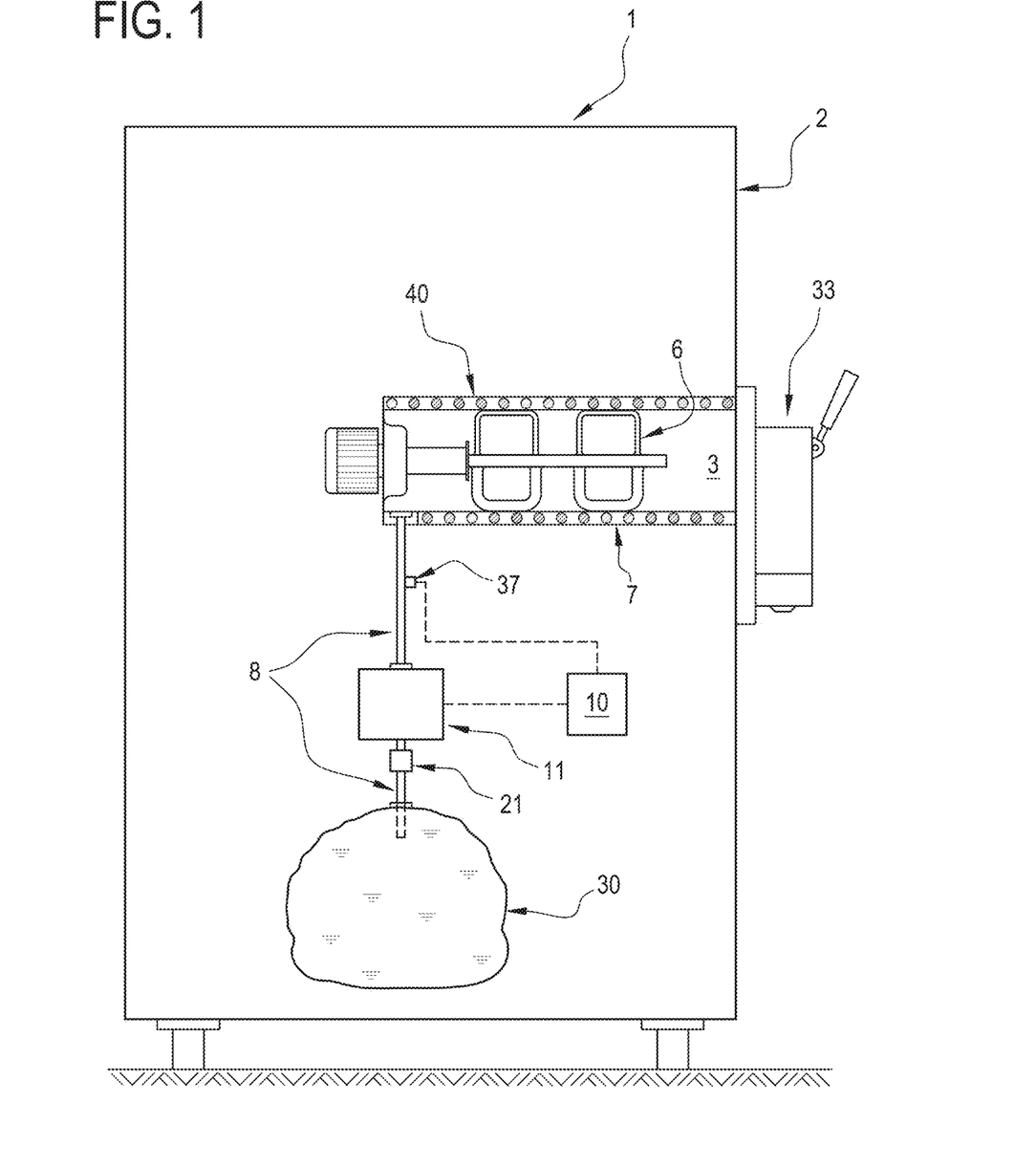
FIG. 1 is a schematic side view of a first embodiment of a machine of this invention for making food products.
Figure 3:
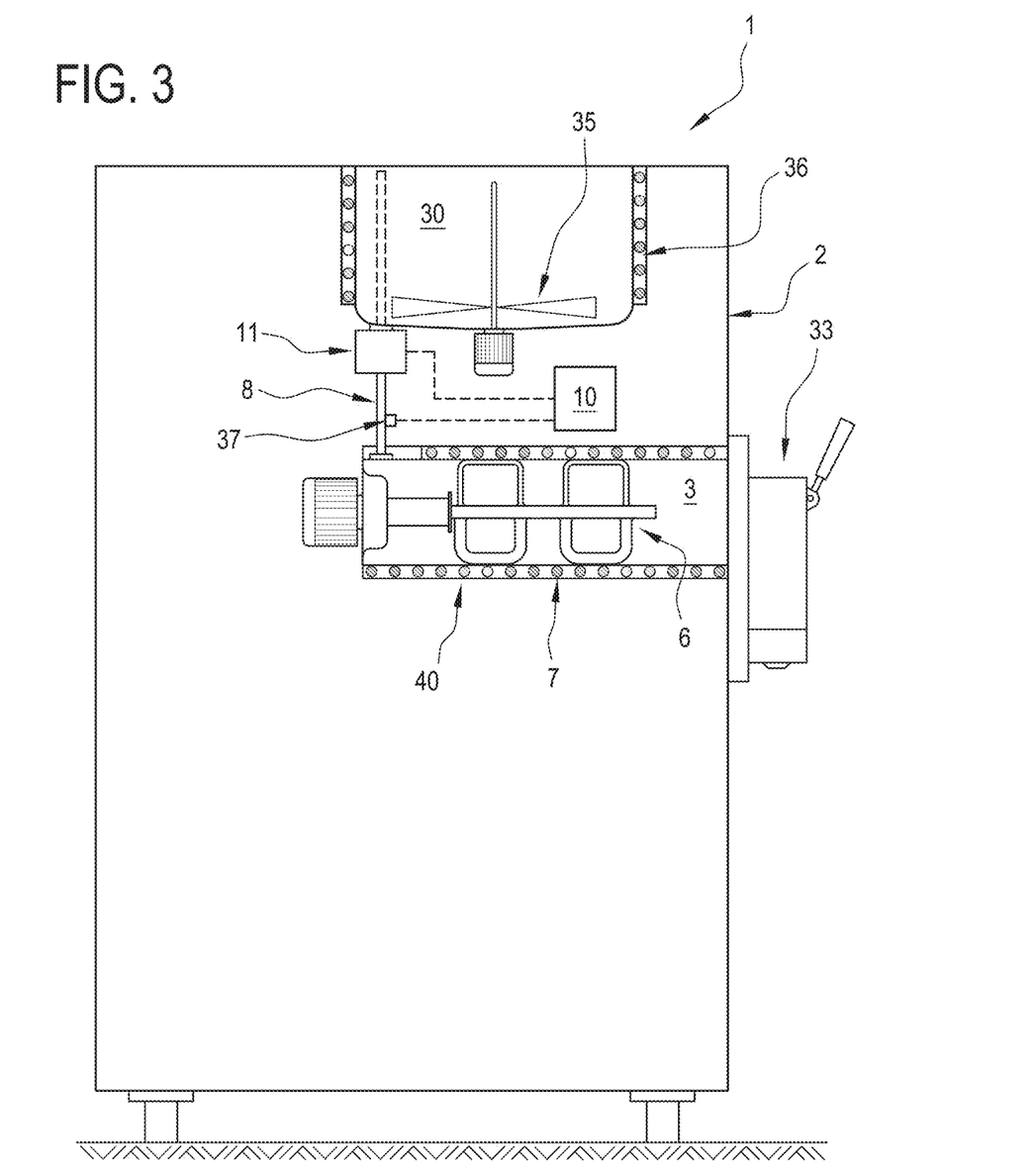
FIG. 3 is a schematic side view of a third embodiment of a machine of this invention for making food products.
Figure 4:
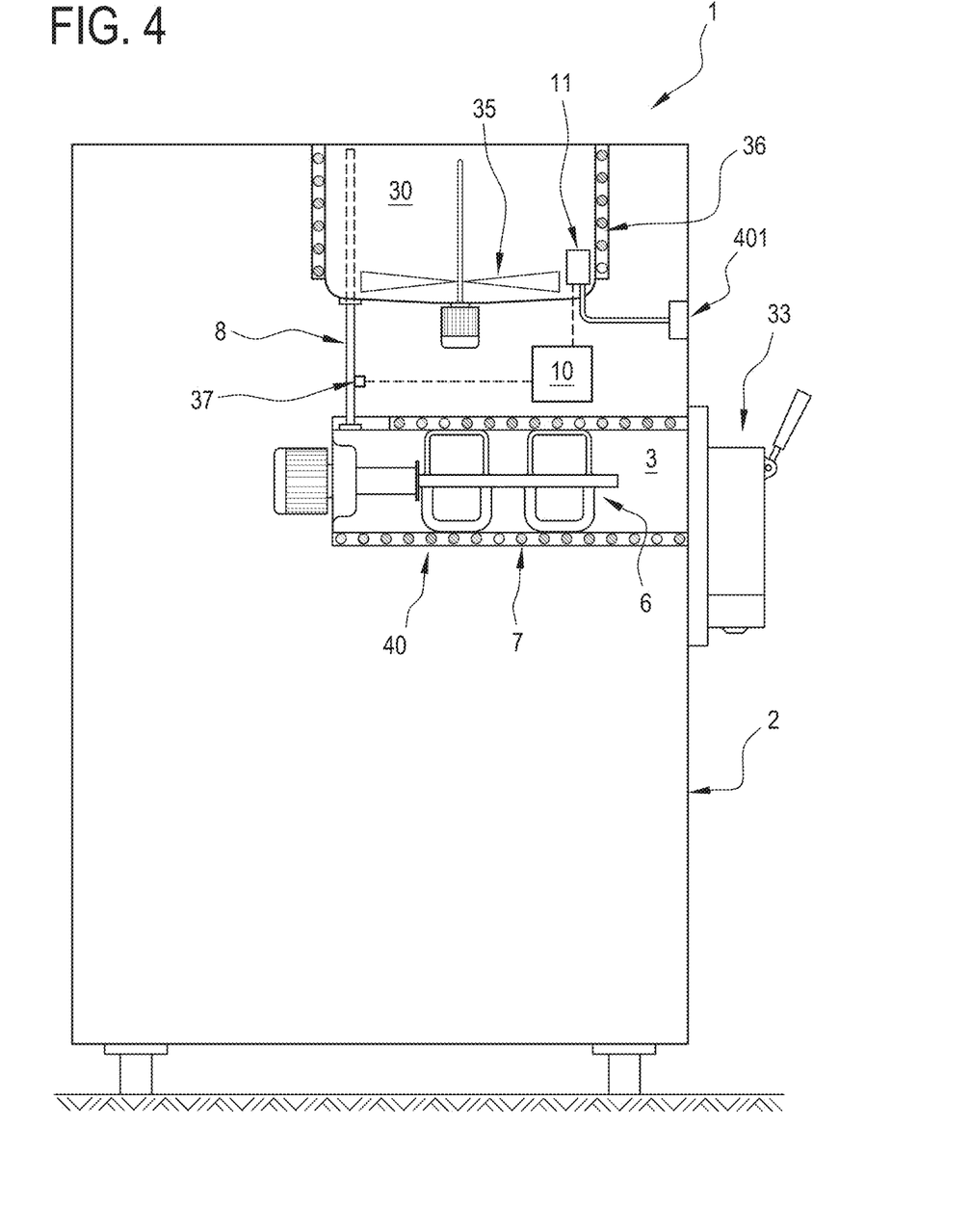
FIG. 4 is a schematic side view of a fourth embodiment of a machine of this invention for making food products.

Preferably, but not necessarily, the machine 1 is an ice cream machine (in particular in the embodiments illustrated in FIGS. 1, 3 and 4).

Still more preferably, the machine 1 is a machine for making soft serve ice cream (or similar products such as sorbets, etc.).

Figure 2:
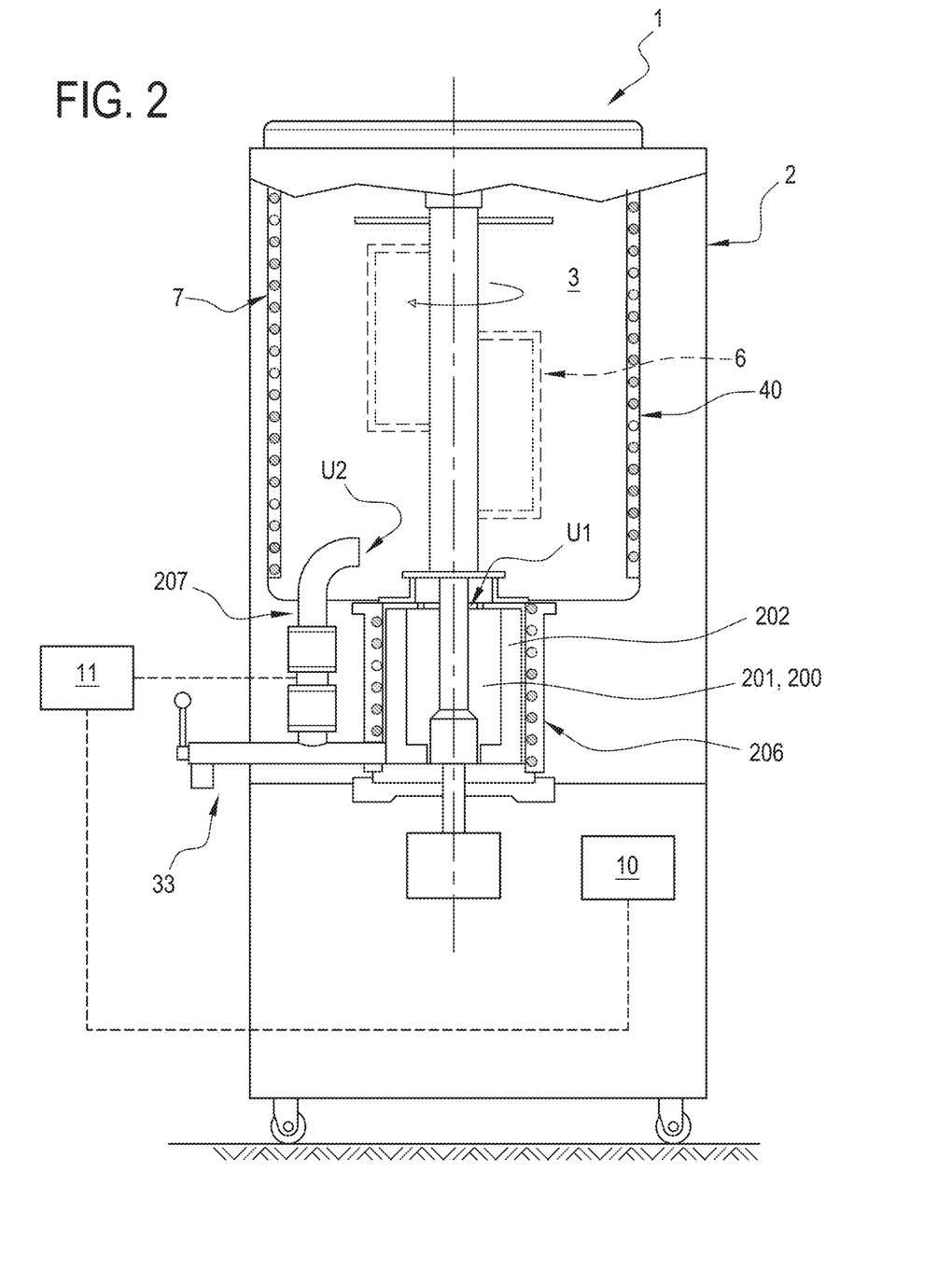
FIG. 2 is a schematic side view of a second embodiment of a machine of this invention for making food products.
Figure 5:
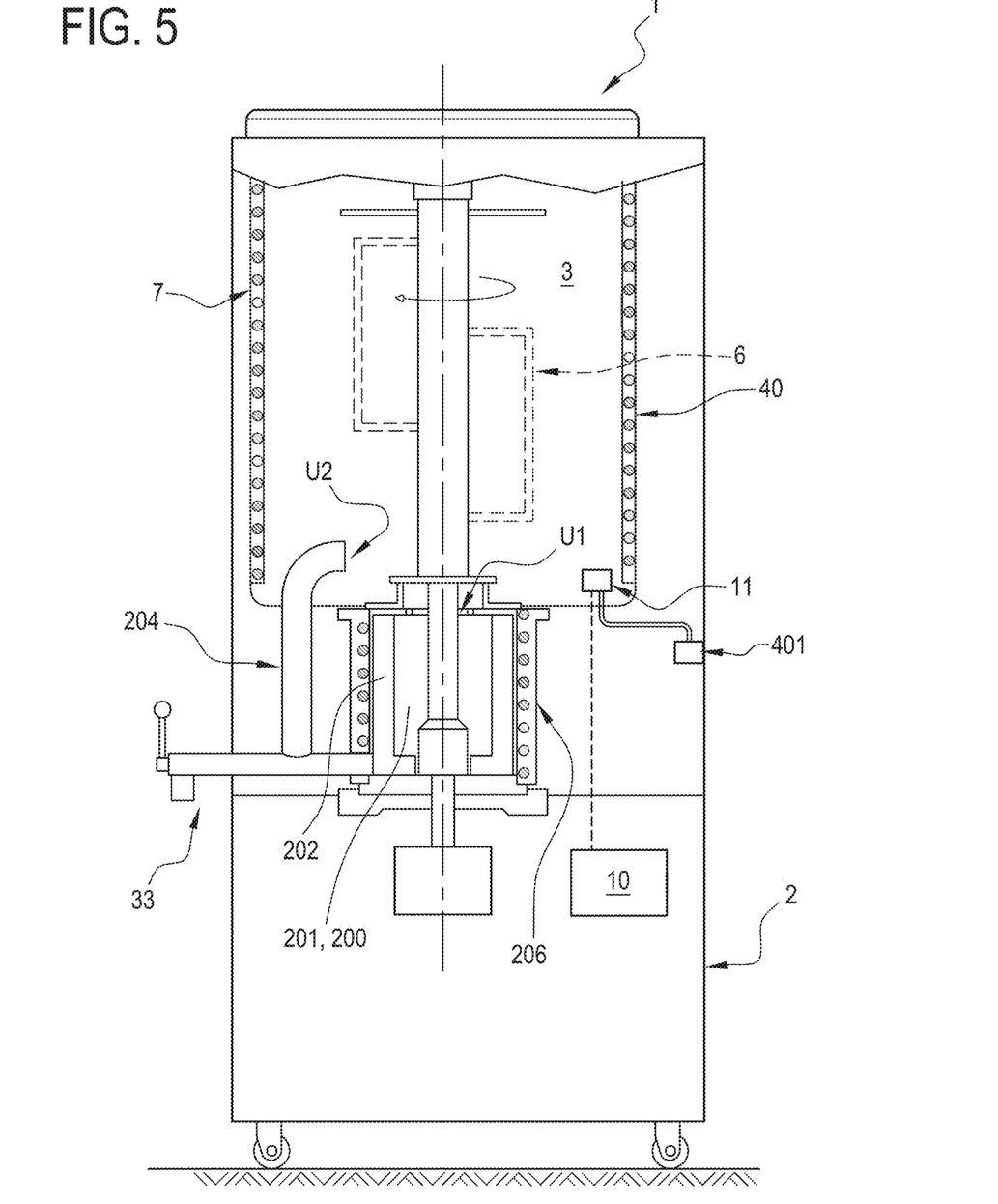
FIG. 5 is a schematic side view of a fifth embodiment of a machine of this invention for making food products.

In further embodiments, the machine 1 is a pasteurizer (in particular the machine illustrated in FIGS. 2 and 5).

It should be noted that the expression "machine 1 for making" also applies to a machine especially designed for the (heat) treatment of food products.

According to the invention, the machine 1 for making food products comprises a frame 2.

According to another aspect, the machine 1 comprises at least one (first) processing container 3 adapted to allow processing a liquid or semi-liquid base mixture.

Below is a brief description of the embodiments of the machine 1 in FIGS. 1-5.

In the embodiment of FIG. 1, the first container 3 is a cylindrical container.

Preferably, the first container 3 has a vertical axis symmetry (in an embodiment not illustrated).

Alternatively, the first container 3 has a horizontal axis symmetry (as illustrated in FIG. 1).

Preferably, as illustrated in FIG. 1, the machine of this embodiment comprises a further supply container 30.

Preferably, in an embodiment, the further supply container 30 is a flexible container (that is, a bag).

In this case, the machine preferably comprises a pump 21 (illustrated schematically in FIG. 1).

The pump 21 is preferably a peristaltic pump.

It should be noted that the pump 21 is interposed between the supply container 30 and the first container 3 to allow the base mixture to be transferred from the supply container 30 to the first container 3.

According to another aspect, the first container 3 defines a processing chamber for the base mixture and the machine 1 is equipped with a stirrer 6 and with thermal treatment means 7 for the base mixture, operating in conjunction with one another to convert the base mixture into a liquid or semi-liquid product.

Preferably, the thermal treatment means 7 comprise a thermodynamic system adapted to run a thermodynamic cycle.

The thermodynamic system preferably comprises a closed circuit containing a heat exchanger fluid (circulating inside the circuit).

The thermodynamic system preferably comprises a compressor disposed along the circuit.

The thermodynamic system preferably comprises a first exchanger, disposed along the circuit.

The thermodynamic system preferably comprises a second exchanger 40 disposed along the circuit. Preferably, the second exchanger 40 is associated with the first container 3.

The thermodynamic system preferably comprises a pressure reducing element (e.g. a throttle valve).

It should be noted that the compressor is disposed in one leg of the circuit, interposed between an inlet of the first exchanger and an outlet of the second exchanger 40, whilst the pressure reducing element is disposed in another leg of the circuit, between an outlet of the first exchanger and an inlet of the second exchanger 40.

The thermodynamic cycle is preferably a vapor compression cycle.

Described below are the machines 1 of FIGS. 3 and 4.

In the embodiment of FIGS. 3 and 4, the further supply container 30 is a tank.

A thermal treatment cycle for the purposes of homogenization and/or pasteurization is performed inside the supply container 30.

In this case, transfer of the base mixture from the further supply container 30 to the first container 3 is carried out by gravity.

Preferably, the tank has a stirrer 35 mounted inside it.

As illustrated in FIG. 3, the machine 1 comprises a further heat exchanger 36 forming part of the thermodynamic system.

The further heat exchanger 36 is associated with the second container 30.

According to another aspect, the machine 1 comprises a connecting duct 8 connecting the first container 3 to the second container 30 and configured to connect the first container 3 operatively to the second container 30 in such a way as to allow the base mixture to be transferred from the first container 30 to the second container 3.

According to another aspect, the machine 1 comprises a dispenser 33 connected to the first container 3 to allow the product to be extracted.

The dispenser 33 can be turned on or off to allow or inhibit dispensing of the product from the first container 3, respectively.

Described briefly below are the machines of FIGS. 2 and 5 (these machines 1 are, in particular, pasteurizers).

According to one aspect, the machine 1 of FIGS. 2 and 5 also comprises an outlet U1 and an inlet U2 of the first container 3 and a circulation pump 200, connected to the outlet U1 to extract (liquid or semi-liquid) product from the first container 3 and to the inlet U2 to pump the product into the first container 3.

According to another aspect, the machine 1 comprises thermal treatment means 206 associated with the circulation pump 200.

Preferably, the thermal treatment means 206 comprise a heat exchanger (of thermal type).

Preferably, the machine 1 comprises a housing 202 (or trap) formed at the bottom of the first container 3 and a second stirrer 201 mounted rotatably inside the housing 202, the circulation pump 200 being defined by the second stirrer 201 and the housing 202.

The housing 202 is connected to the inlet U2 of the container 3 by a duct 207.

According to the invention, the machine 1, independently of the embodiment, comprises at least one device 11 for generating gas micro bubbles or nano bubbles, operatively configured to release gas micro bubbles or nano bubbles into the mixture being processed in the machine 1.

The machine 1 further comprises a control and drive unit 10 which is connected to the device 11 for generating gas micro bubbles or nano bubbles in order to control and drive it.

It should be noted that the term "micro bubbles" is used to denote gas bubbles whose (equivalent or mean) diameter is less than 100 microns.

It should be noted that the term "nano bubbles" is used to denote gas bubbles whose (equivalent or mean) diameter is less than 1 micron.

Preferably, the device 11 for generating gas micro bubbles or nano bubbles is configured to generate gas bubbles having an (equivalent or mean) diameter of less than 100 microns (namely, micro bubbles).

Preferably, the device 11 for generating gas micro bubbles or nano bubbles is configured to generate gas bubbles having a Reynolds number substantially equal to 1.

As is known, the Reynolds number (Re) is defined as:

$$Re = \frac{\rho \langle v \rangle d}{\mu}$$

Where:

ρ is the density (kg/m$^3$);

$\langle v \rangle$ is the mean velocity (m/s);

d is a characteristic length of the phenomenon which, in the case of motion in a duct, corresponds to the hydraulic diameter (m);

μ is the dynamic viscosity (Pa·s).

According to another aspect, the device 11 for generating gas micro bubbles or nano bubbles is preferably configured to generate gas bubbles which are spherical in shape.

Preferably, the device 11 for generating gas micro bubbles or nano bubbles is configured to generate gas bubbles having an (equivalent or mean) diameter of less than 80 microns.

Preferably, the device 11 for generating gas micro bubbles or nano bubbles is configured to generate gas bubbles having an (equivalent or mean) diameter of less than 50 microns.

Preferably, the device 11 for generating gas micro bubbles is configured to generate gas bubbles having an (equivalent or mean) diameter of less than 25 microns.

Preferably, the device 11 for generating gas micro bubbles is configured to generate gas bubbles having an (equivalent or mean) diameter of less than 10 microns.

Preferably, the device 11 for generating gas micro bubbles or nano bubbles is configured to generate gas bubbles having an (equivalent or mean) diameter of less than 5 microns.

Preferably, the device 11 for generating gas micro bubbles or nano bubbles is configured to generate gas bubbles having an (equivalent or mean) diameter of less than 1 micron (namely, nano bubbles).

According to another aspect, the machine 1 comprises a control and drive unit 10 which is connected to the device 11 for generating gas bubbles in order to control and drive it.

According to another aspect, the device 11 for generating gas micro bubbles or nano bubbles is configured to generate bubbles of one among the following:
- a gaseous mixture comprising oxygen and nitrogen;
- air;
- oxygen;
- nitrogen;
- carbon dioxide.

According to another aspect, the device 11 for generating gas micro bubbles or nano bubbles comprises a source of pressurized gas and a duct for transporting the pressurized gas.

According to yet another aspect, the machine 1 comprises a sensor adapted to capture an operating parameter of the machine 1, the control and drive unit 10 being connected to the sensor and being configured to activate the device 11 for generating gas micro bubbles or nano bubbles as a function of the signal captured by the sensor.

According to yet another aspect, the machine 1 comprises a sensor adapted to capture the flow rate of the mixture, the control and drive unit 10 being connected to the sensor and being configured to activate the device 11 for generating gas micro bubbles or nano bubbles as a function of the signal captured by the sensor.

Described below are some examples of devices 11 for generating micro bubbles or nano bubbles, applicable to one or more of the machines 1 described above.

Figure 8:
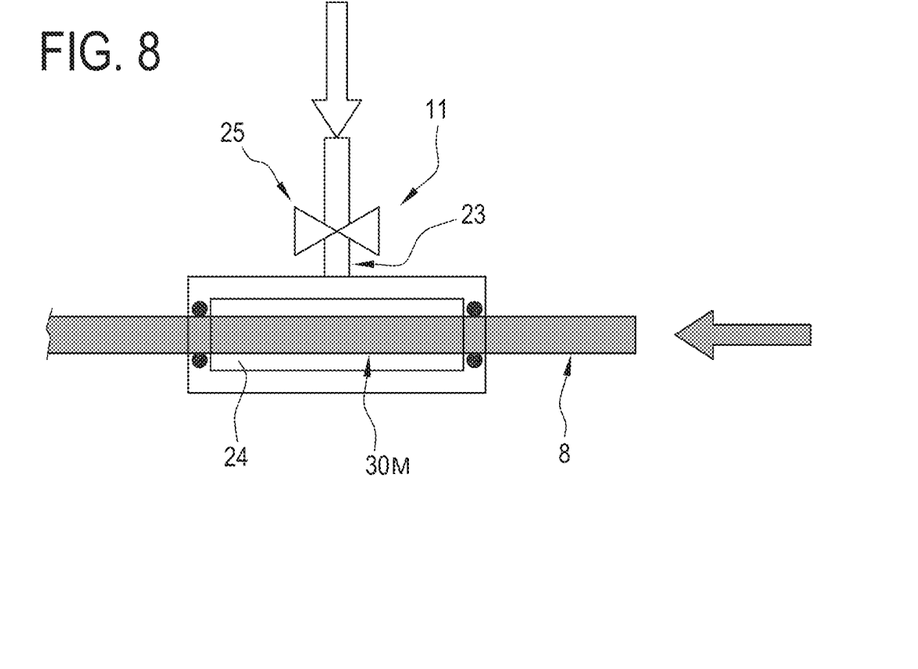
FIG. 8 illustrates an embodiment of a device for generating micro bubbles or nano bubbles usable in any of the machines of FIGS. 1 to 3.

FIG. 8 shows an embodiment of a device 11 for generating micro bubbles or nano bubbles, described below.

The device 11 comprises a membrane 30M which is permeable to gas (porous) and impermeable to the base liquid.

More precisely, the gas permeable membrane 30M defines a stretch of the duct 8 inside a chamber 24.

The gas is fed into the chamber 24 through an inlet 23.

Preferably, the inlet 23 is connected to a gas pressuring device, that is, a source of pressurized gas.

It should be noted, therefore, that the gas inside the chamber 24 passes through the porous membrane 30M and penetrates directly into the duct 8, forming micro bubbles or nano bubbles of gas at the interface defined by the porous membrane The device 11 preferably also comprises a valve 25, associated with the inlet 23 to open or close the inlet.

The valve 25 is preferably driven by the control and drive unit 10.

It should be noted that according to one aspect, the control and drive unit 10 preferably opens the valve 25 and simultaneously activates the pump 21.

That way, micro bubbles are added to the mixture in transit through the chamber 24.

Figure 6:
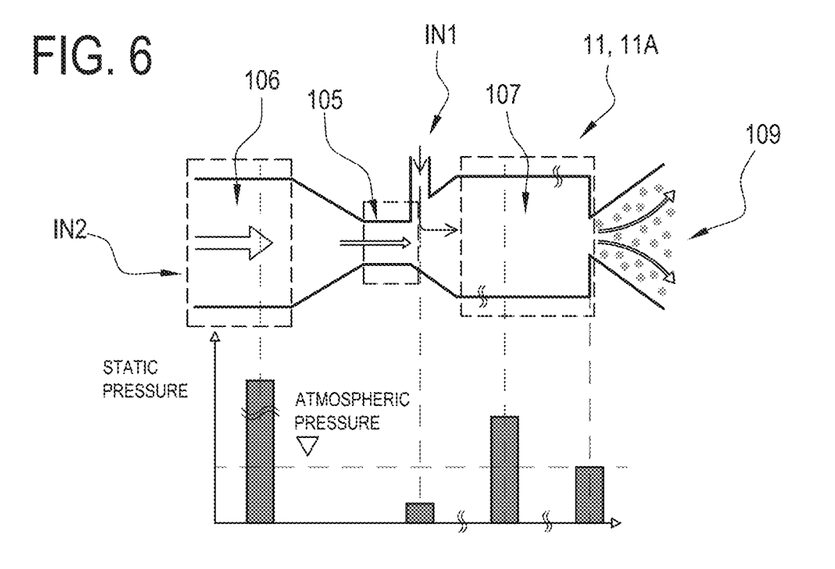
FIG. 6 schematically illustrates an example embodiment of a device for generating micro bubbles or nano bubbles usable in any of the machines of FIGS. 1 to 3.

In a further embodiment of the device 11, illustrated in FIG. 6, the device 11 for generating micro bubbles is a Venturi device 11A and is provided with a constricted section zone 105 traversed by the base mixture circulating in the duct 8 where a gas inlet IN1 is connected, so as to allow micro bubbles to be formed in the base mixture.

It should be noted that a negative pressure, or reduced pressure, is created in the constricted section zone 105.

The graph below FIG. 6 represents the trend of the static pressure of the mixture inside the device 11A of FIG. 6.

With reference to the direction of flow of the base mixture, the device 11A comprises a first zone 106, upstream, a second, constricted section zone 105, and a third zone 107.

Preferably, the device 11A comprises a gas inlet IN1.

Preferably, the gas inlet IN1 is disposed in the constricted section zone 105.

Still more preferably, the gas inlet IN1 is disposed at the transit zone between the second, constricted section 105 and the third zone 107.

Preferably the cross section of the third zone 107 (in a plane at right angles to the direction of extension of the device 11A) is smaller than the cross section of the first zone 106.

As is evident, the pressure in the constricted section zone 105 is less than that in the first zone 106 and in the third zone 107.

In particular, the gas is absorbed by the liquid by effect of the negative pressure generated in the constricted section zone 105.

Next, in the third zone 107, whose cross section is greater than that of the constricted section zone 105, the mixture of gas and base mixture is pressurized.

Since the solubility of the gas and liquid forming part of the base mixture decreases in the zone 106, bubbles are formed by effect of the presence of super saturated gas (that is, in a quantity greater than the liquid is capable of absorbing).

Thus, the base mixture at the outlet 109 of the device 11A has micro bubbles or nano bubbles in it.

Figure 7:
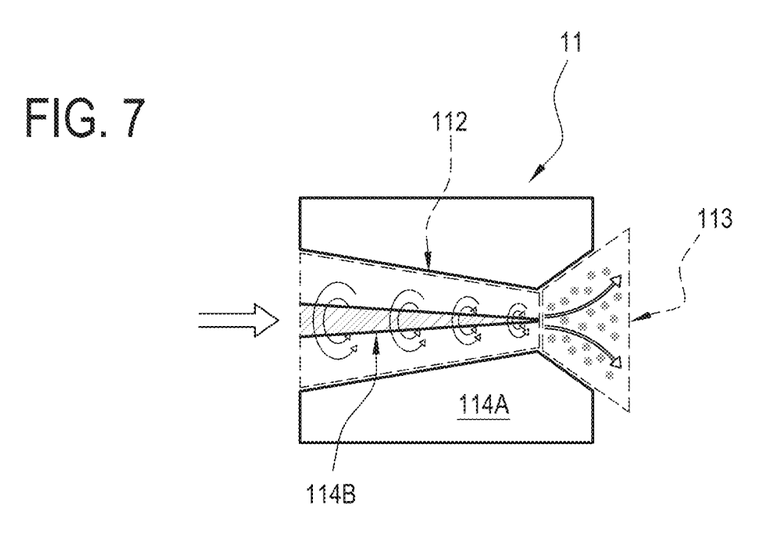
FIG. 7 schematically illustrates an example embodiment of a device for generating micro bubbles or nano bubbles usable in either of the machines of FIG. 4 or 5.

FIG. 7 shows a further embodiment of the device 11 for generating micro bubbles.

In this embodiment, the device 11 comprises a portion 114A and a second portion 114B which are movable relative to each other.

The second portion 114B is preferably rotatable relative to the first portion 114A.

It should be noted that the rotation of the second portion 114B (relative to the first portion 114A) causes micro bubbles or nano bubbles to be generated.

Thus, micro bubbles or nano bubbles are generated in the zone labelled 112 in FIG. 7 and are then incorporated into the mixture in the zone labelled 113 in FIG. 7.

In this embodiment, the micro bubbles or nano bubbles are generated by effect of the rotation of the second portion 114B.

Alternatively, in an embodiment not illustrated, the device 11 comprises at least one rotary element (e.g. a fan) disposed in contact with the base mixture to rotate and generate micro bubbles or nano bubbles.

Figure 9:
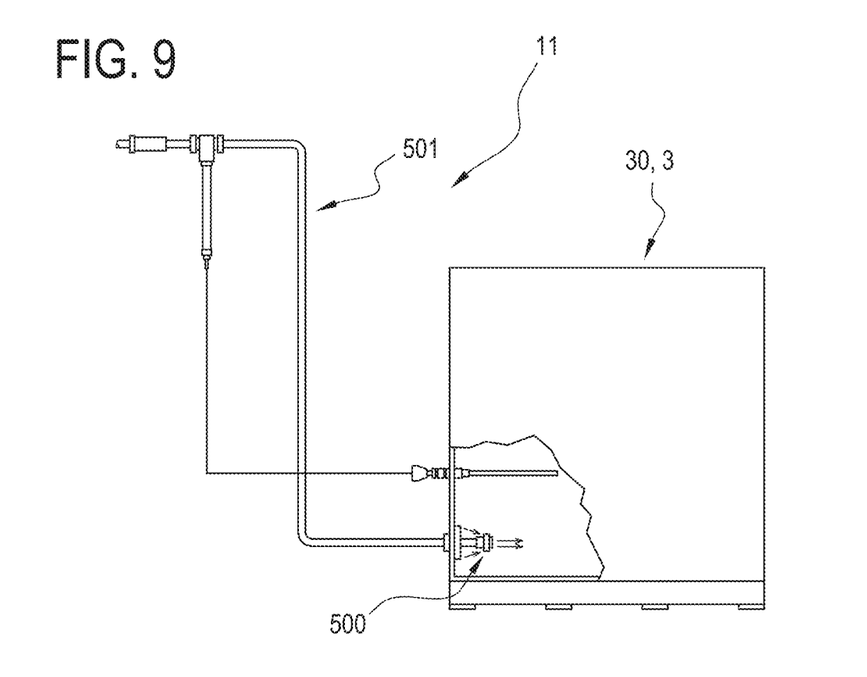
FIG. 9 schematically illustrates an example embodiment of a sparging device for generating micro bubbles or nano bubbles applicable to the machines of FIGS. 4 and 5.

FIG. 9 shows a further embodiment of the device for generating micro or nano bubbles usable in accordance with this invention.

More specifically, the device illustrated in FIG. 9, is a sparging device 11 applicable to the machines of FIGS. 4 and 5.

A sparging system is a system for injecting a gas into a liquid.

Preferably, the sparging system operates inside the container 3, 30 of the machines of FIGS. 4 and 5.

In this embodiment, the sparging system releases a gas (e.g. air or nitrogen) capable of supersaturating the liquid with gas inside the container 3, 30 of the machines of FIGS. 4 and 5.

It should be noted that the sparging device 11 preferably comprises a gas transporting duct 501 and an injector 500 applied to one end of the duct 501.

The injector 500 is disposed inside the container 3, 30 of the machines of FIGS. 4 and 5.

Figure 10:
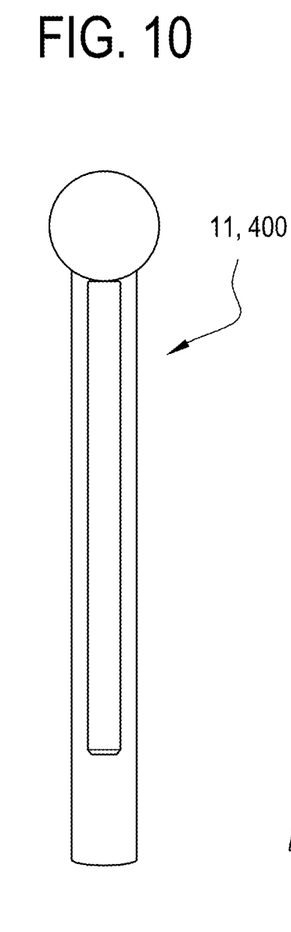
FIGS. 10, 11 and 12 schematically illustrate an example embodiment of a device for generating micro bubbles or nano bubbles applicable to the machines of FIGS. 4 and 5.
Figure 11:
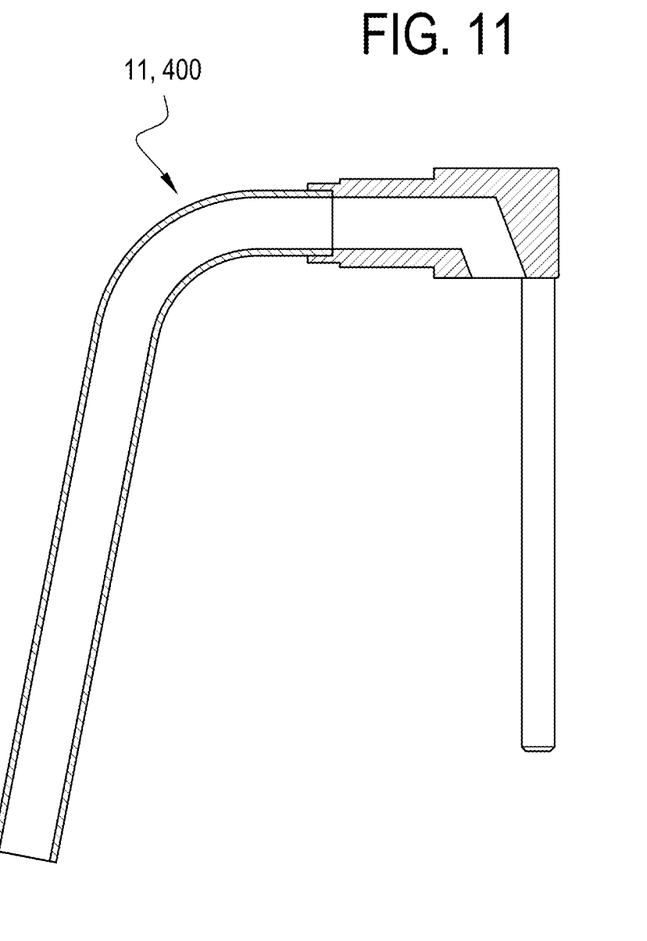
Figure 12:
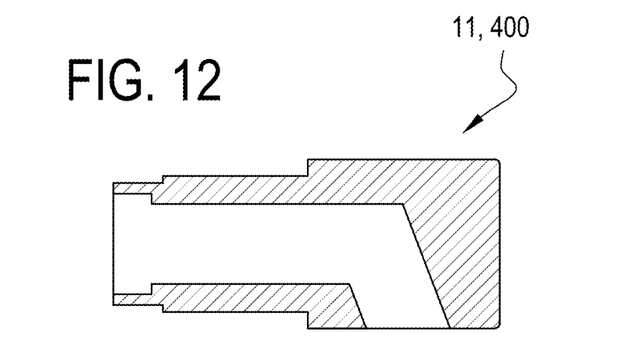

FIGS. 10, 11 and 12 illustrate a further embodiment of a device 11 for injecting micro or nano bubbles, applicable to the machines of FIGS. 4 and 5, specifically to the container 3, 30 of these machines.

The device 11 of FIGS. 10, 11 and 12 comprises an injection device 400 (clearly visible in FIGS. 9, 10 and 11).

The injection device 400 releases gas in the form of micro or nano bubbles.

Preferably, the injection device 400 comprises a nozzle (clearly visible in FIGS. 9, 10 and 11).

Preferably, the nozzle is connected to a pressurized gas source 401.

Preferably, the device 11 illustrated in FIGS. 10, 11 and 12 comprises a valve, not illustrated, interposed between the nozzle and the pressurized gas source 401.

It should be noted that one advantage of this invention is that of providing a high quality ice cream. Indeed, the ice cream thus obtained, provided with diffuse gas particles (micro or nano bubbles) has a smooth, compact structure and is extremely soft on the palate.

Advantageously, according to another aspect, the device 11 is configured to produce hydrodynamic cavitation, that is, implosion of the bubbles, resulting in localized energy being generated.

More generally speaking, it should be noted that the machine 1 may be fitted with static type devices 11 for generating micro bubbles or nano bubbles (embodiments of FIGS. 7, 9, 10-12), that is, operating in the absence of movement/flow of the liquid into which they have to release the micro bubbles or nano bubbles, or dynamic type devices 11 for generating micro bubbles or nano bubbles (embodiments of FIGS. 6 and 8) which operate in the presence of movement/flow of the liquid into which they have to release the micro bubbles or nano bubbles.

It should also be noted, more generally speaking, that the embodiments of the devices 11 described herein for generating micro bubbles or nano bubbles are not exhaustive but only exemplary: in effect, based on the knowledge of a person skilled in the trade, the machine 1 might be fitted with micro bubble or nano bubble generating devices 11 of a different kind from those described in this disclosure.

A person skilled in the trade will understand that different micro bubble generating devices 11 can be used in the machine 1 of this invention.

Also defined according to this invention is a method for making liquid or semi-liquid food products in a machine 1 for making liquid or semi-liquid food products, comprising the following steps:
  generating micro bubbles or nano bubbles in a base mixture by means of the device 11 for generating gas micro bubbles or nano bubbles;
  placing the base mixture inside the first container 3;
  setting the stirrer 6 mounted inside the first container 3 in rotation and cooling the mixture of base product containing the micro bubbles or nano bubbles in order to make a liquid or semi-liquid food product inside the first container 3.

Preferably, according to one aspect, the step of placing the base mixture inside the first container 3 temporally precedes the step of generating micro bubbles or nano bubbles in a base mixture by means of a device 11 for generating gas micro bubbles or nano bubbles.

According to another aspect, the step of generating micro bubbles or nano bubbles in the mixture by means of the device 11 for generating gas micro bubbles or nano bubbles comprises a step of generating the bubbles by hydrodynamic cavitation.

According to another aspect, the method comprises a step of preparing a base mixture which comprises step of adding a base liquid to a portion of base powder product and the step of generating micro bubbles or nano bubbles in the base mixture comprises a step of generating micro bubbles or nano bubbles in the base liquid before adding the base liquid to the portion of base powder product.

According to yet another aspect, the base liquid comprises water.

According to this aspect, the micro bubbles or nano bubbles are preferably generated in the water.

According to yet another aspect, the base liquid comprises milk.

According to this aspect, the micro bubbles or nano bubbles are preferably generated in the milk.

What is claimed is:

1. A machine for making food products, comprising:
  a frame;
  at least a first container containing a liquid or semi-liquid base product to be processed therein;
  a stirrer mounted inside the first container;
  a thermal treatment system thermally connected with the first container, the thermal treatment system including a heat exchanger thermally connected with the first container;
  a dispenser connected to the first container to allow the base product to be extracted from the first container;
  a generation device for generating gas micro bubbles or nano bubbles, operatively configured to release the gas micro bubbles or nano bubbles into the base product being processed in the machine;
  a controller connected to the generation device to control and drive the generation device, wherein the generation device is configured to generate the gas micro bubbles or nano bubbles having an equivalent diameter of less than 50 microns;
  wherein the generation device includes a gas permeable membrane defining a portion of a duct.

2. The machine according to claim 1, wherein the machine is an ice cream machine and the first container is a cylindrical container, the stirrer being configured to scrape an inside wall of the first container.

3. The machine according to claim 1, wherein the generation device is configured to release gas bubbles having an equivalent diameter of less than 10 microns.

4. The machine according to claim 1, wherein the generation device is configured to generate bubbles of one among the following:
  a gaseous mixture comprising oxygen and nitrogen;
  air;
  oxygen;
  nitrogen;
  carbon dioxide.

5. The machine according to claim 1, wherein the generation device comprises a source of pressurized gas and a further duct for transporting the pressurized gas.

6. The machine according to claim 1, and further comprising a sensor adapted to capture an operating parameter of the machine, the controller being connected to the sensor and being configured to activate the generation device as a function of a signal generated by the sensor.

7. The machine according to claim 1, wherein the generation device for generating micro bubbles comprises a chamber, the gas permeable membrane being disposed inside the chamber and the chamber includingbeing provided with a gas inlet.

8. The machine according to claim 1, wherein the generation device further includes a Venturi device including a constricted section zone traversed by the base product circulating in the duct where a gas inlet is connected, so as to allow the gas micro bubbles or nano bubbles to be formed in the base product.

9. The machine according to claim 1, wherein the generation device is further configured to generate hydrodynamic cavitation.

10. The machine according to claim 1, further comprising:
a second container including a stirrer and being thermally connected with a further heat exchanger of the thermal treatment system for thermally treating the base mixture in the second container;
wherein the duct connects the second container to the first container and is configured to operatively connect the second container to the first container to allow the base product to be transferred from the second container to the first container.

11. The machine according to claim 10, wherein the generation device is operatively connected with the duct to release the gas micro bubbles or nano bubbles into the base product in transit along the duct itself.

12. The machine according to claim 1, further comprising an outlet and an inlet of the first container and a circulation pump, connected to the outlet to pump the base product out of the first container, and to the inlet to pump the base product into the first container.

13. The machine according to claim 12, wherein the thermal treatment system further comprises a further heat exchanger thermally connected with the circulation pump.

14. The machine according to claim 12, comprising a housing formed at atho bottom of the first container and a second stirrer mounted rotatably inside the housing, the circulation pump being defined by the second stirrer.

15. The machine according to claim 1, wherein the generation device is operatively connected with the first container to release the gas micro bubbles or nano bubbles directly into the base product inside the first container.

16. The machine according to claim 15, wherein the first container is a tub.

17. The machine according to claim 16, wherein the machine is a pasteurizer.

18. The machine according to claim 1, wherein the generation device further comprises a sparging system.

19. A method for making liquid or semi-liquid food product, comprising the following steps:
providing a machine for making the liquid or semi-liquid food product, the machine comprising:
a frame;
at least a first container containing a liquid or semi-liquid base product to be processed therein;
a stirrer mounted inside the first container;
a thermal treatment system thermally connected with the first container, the thermal treatment system including a heat exchanger thermally connected with the first container;
a dispenser connected to the first container to allow the base product to be extracted from the first container;
a generation device for generating gas micro bubbles or nano bubbles, operatively configured to release the gas micro bubbles or nano bubbles into the base product being processed in the machine;
a controller connected to the generation device to control and drive the generation device, wherein the generation device is configured to generate the gas micro bubbles or nano bubbles having an equivalent diameter of less than 50 microns;
wherein the generation device includes a gas permeable membrane defining a portion of a duct;
generating the gas micro bubbles or nano bubbles having thea-n equivalent diameter of less than 50 microns in the base product using the generation device;
placing the base product inside the first container;
setting the stirrer mounted inside the first container in rotation and cooling the base product containing the gas micro bubbles or nano bubbles in order to make the liquid or semi-liquid food product inside the first container.

20. The method according to claim 19, wherein the step of generating the micro bubbles or nano bubbles in the base product via the generation device further comprises a step of generating the bubbles by hydrodynamic cavitation.

21. The method according to claim 19, comprising a further step of preparing thea base product which comprises a step of adding a base liquid to a portion of base powder product and the step of generating the gas micro bubbles or nano bubbles in the base product comprises a step of generating the gas micro bubbles or nano bubbles in the base liquid before adding the base liquid to the portion of base powder product.

22. The method according to claim 21, wherein the base liquid comprises water.

23. The method according to claim 21, wherein the base liquid comprises milk.

* * * * *